(12) United States Patent
Sijstermans et al.

(10) Patent No.: US 6,889,242 B1
(45) Date of Patent: May 3, 2005

(54) ROUNDING OPERATIONS IN COMPUTER PROCESSOR

(75) Inventors: Frans W. Sijstermans, Los Altos, CA (US); Jos van Eijndhoven, Waalre (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 602 days.

(21) Appl. No.: 09/895,272

(22) Filed: Jun. 29, 2001

(51) Int. Cl.[7] .................................................. G06F 7/38
(52) U.S. Cl. ........................................ 708/551; 708/497
(58) Field of Search .............................. 708/551, 497, 708/445, 209

(56) References Cited

U.S. PATENT DOCUMENTS

| | | | | |
|---|---|---|---|---|
| 4,953,119 A | * | 8/1990 | Wong et al. ................. 708/513 |
| 5,363,322 A | * | 11/1994 | Gergen et al. .............. 708/620 |
| 5,696,709 A | * | 12/1997 | Smith, Sr. .................... 708/551 |
| 5,917,739 A | * | 6/1999 | Wong .......................... 708/445 |
| 6,007,232 A | * | 12/1999 | Wong .......................... 708/445 |
| 6,058,410 A | * | 5/2000 | Sharangpani ............... 708/551 |
| 6,076,154 A | | 6/2000 | Van Eijndhoven et al. ... 712/24 |
| 6,134,633 A | | 10/2000 | Jacobs ........................ 711/137 |
| 6,226,715 B1 | | 5/2001 | Van Der Wolf et al. .... 711/133 |
| 6,243,728 B1 | * | 6/2001 | Farooqui et al. ............ 708/209 |
| 6,684,232 B1 | * | 1/2004 | Handlogten et al. ........ 708/204 |

* cited by examiner

*Primary Examiner*—D. H. Malzahn
(74) *Attorney, Agent, or Firm*—Kevin Simons

(57) ABSTRACT

Various methods for performing rounding operations in a computer processor are described. A machine instruction sets the rounding mode, which is automatically applied to subsequent machine instructions. Using machine instructions to round results according to the selected rounding mode has several advantages over software-implemented rounding techniques, such as faster execution and concise code. A variety of rounding modes can be specified. Depending in part on the specified rounding mode and on the sign of the value to be rounded, a rounding term is added to the value to be rounded. Adding this rounding term ensures that the desired result is obtained. The value thus obtained is then right-shifted.

53 Claims, 16 Drawing Sheets

ROUNDING OPERATIONS IN COMPUTER PROCESSOR

TECHNICAL FIELD

The invention relates to programmable processors and, more particularly, to mathematical operations in such processors.

BACKGROUND

In conventional programmable processors, floating point operations are mathematical operations in which the operands and the results are represented in fractional form. In certain situations, however, it is desirable to obtain an integer result. For example, while the floating point operation 15/4 yields the result 3.75, it may be preferable under some circumstances to return a result of 3 or 4. In such cases, the preferred result can be obtained using a rounding operation.

Some processors perform such rounding operations by rounding down in all cases or, alternatively, by rounding up in all cases. For processors that round down in all cases, for example, a value of 3.999 rounds to 3, while a value of −3.999 rounds to −4. By contrast, for processors that always round up, a value of 3.999 rounds to 4, while a value of −3.999 rounds to −3. While these results are acceptable for some applications, other applications, such as those intended to be compliant with standards, require symmetrical rounding. For such applications, for instance, if a value of 3.999 rounds to 3, a value of −3.999 should round to −3, rather than −4.

Some approaches for obtaining compliant rounding results in these situations involve the use of greater degrees of precision. For example, to obtain 16-bit compliance with standards, some processors use 32-bit precision. This approach can produce compliant rounding results, but performance is typically compromised due to the additional operations involved with the higher degree of precision.

Accordingly, a need continues to exist for an integer rounding technique that will produce results that comply with standards, while maintaining efficient processor performance.

SUMMARY

According to various implementations of the invention, rounding operations are performed by machine instructions based on a selectable rounding mode. A machine instruction is used to set the rounding mode, which is automatically applied to subsequent arithmetic operations. Using machine instructions to round results according to the selected rounding mode has several advantages over software-implemented rounding techniques, such as improved execution speed and increased conciseness of code.

A variety of rounding modes are available for selection using, for example, a three-bit rounding mode field of a control register. A rounding term is added to a result of a floating-point operation, depending in part on the selected rounding mode and on a sign (+ or −) of the result. Adding the rounding term ensures that the desired rounding operation can easily be obtained by a right-shift operation regardless of the selected rounding mode.

In one embodiment, the invention is directed to a method in which a first instruction is executed in a programmable processor to set a rounding mode. A second instruction is executed within the programmable processor to generate an integer result rounded according to the rounding mode.

In another embodiment, the invention is directed to a method in which an operation is performed and the result is rounded according to a selectable rounding mode. A rounding term is added to a result of the integer operation to obtain an intermediate result. The rounding term is determined at least in part as a function of the rounding mode, a shift amount, and a sign of the result of the operation. The intermediate result is then right-shifted by the shift amount.

Other embodiments of the invention include methods for compiling programs for performing these methods, as well as computer-readable media and apparatuses for performing these methods. The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

In general, the invention facilitates rounding operations within a programmable processor in accordance with a selectable rounding mode. A single machine instruction can be used to select one of a variety of rounding modes. Some example rounding modes that can be selected include, but are not limited to, rounding up (or down) in all cases, rounding toward (or away from) zero in all cases, and rounding to the nearest integer. In the latter mode, a rule for handling a fractional part equal to 0.5, e.g. how to round the value 3.5, can also be specified as described more fully below.

Once a rounding mode is set, the programmable processor uses the mode when executing subsequent machine instructions that perform arithmetic operations. The mode may remain in effect until it is changed. Using machine instructions in this way, rather than software-implemented rounding, realizes a number of advantages, including faster execution and more concise code.

In this detailed description, reference is made to the accompanying drawings that form a part hereof, and in which are shown by way of illustration specific embodiments in which the invention may be practiced. It is understood that other embodiments can be utilized and structural changes can be made without departing from the scope of the invention.

Figure 1:
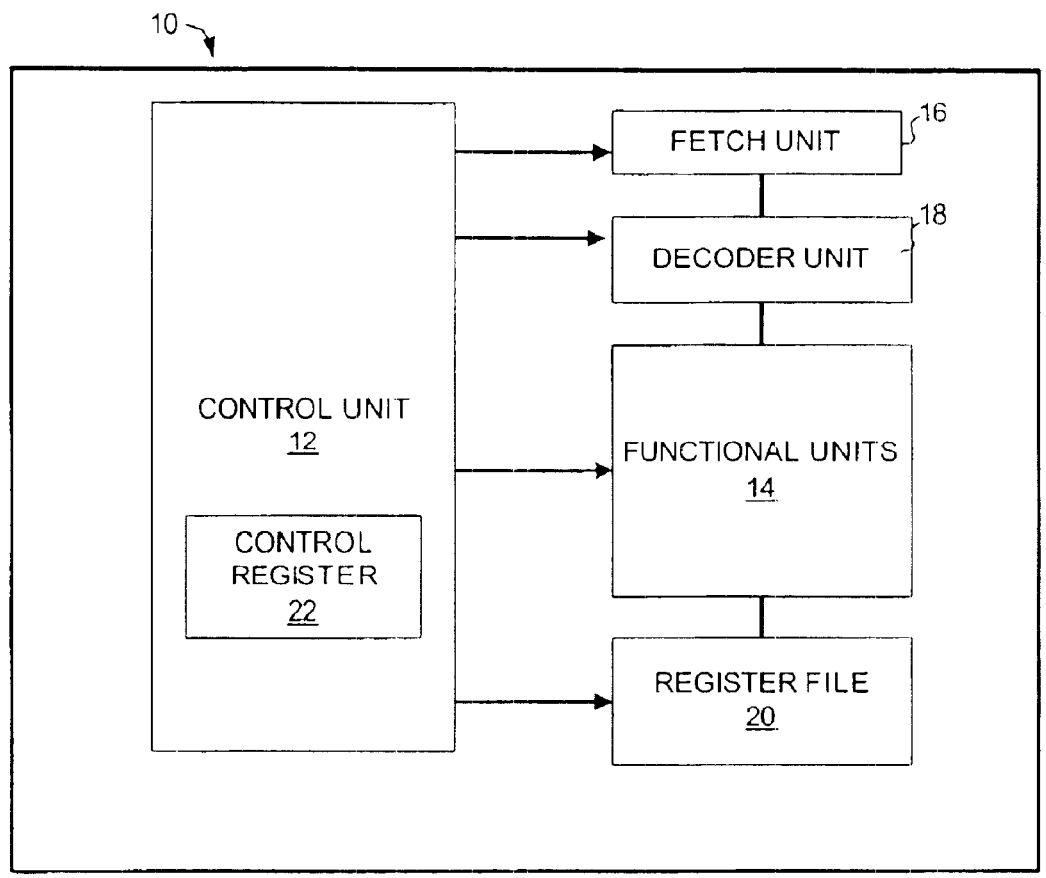
FIG. 1 is a block diagram illustrating an example programmable processor configured to perform rounding operations consistent with the principles of the invention.

FIG. 1 is a block diagram illustrating a programmable processor 10 arranged to support rounding operations in a manner consistent with the principles of the invention. The description of FIG. 1 is intended to provide a brief, general description of suitable processor hardware and a suitable processing environment with which the invention may be implemented. Although not required, the invention is described in the general context of instructions being executed by processor 10.

In accordance with the invention, processor 10 supports an extensive set of arithmetic operations such as, for example, arithmetic operations, including addition, subtraction, and multiplication; logical operations, such as logical AND and OR operations; comparisons; and a variety of multimedia operations. All of these operations are supported for byte, half word, and word vectors and may be performed on integer or floating-point operands. In addition, some operations are also supported for double word vectors.

If a result of an integer operation is not representable, the bit pattern that is returned is operation-specific, as described more fully below in connection with the descriptions of example integer operations. Generally, the returned bit pattern for regular addition and subtraction operations is a wrap around bit pattern. For DSP-type operations, the returned bit pattern is typically clipped against the minimum or maximum representable value. Operations that produce a double precision result, such as integer multiplication, can return the least significant half of the double precision result. Alternatively, the most significant part of the double precision result can be returned, possibly after rounding.

As shown in FIG. 1, processor 10 includes control unit 12 coupled to one or more functional units 14. Control unit 12 controls the flow of instructions and/or data through functional units 14. For example, during the processing of an instruction, control unit 12 directs the various components of processor 10 to fetch and decode the instructions, and to correctly perform the corresponding operations using, for example, functional units 14. Additional units such as fetch unit 16, decode unit 18, or a decompression unit may be coupled to functional units 14 and controlled by control unit 12. In addition, functional units 14 are also coupled to a register file 20, which stores both the operands and the results of operations. Control unit 12 includes control register 22, which stores an indicator of the particular rounding mode to be applied in subsequent arithmetic operations.

In some implementations, the functional units 14 are pipelined such that operations can be loaded into a first stage of a pipelined functional unit and processed through subsequent stages. A stage processes concurrently with the other stages. Data passes between the stages in the pipelined functional units during a cycle of the system. The results of the operations emerge at the end of the pipelined functional units in rapid succession. In other implementations, the functional units 14 are not pipelined.

Though not required, in one mode of operation, the fetch unit 16 fetches an instruction from an instruction stream. This instruction is then decoded by decode unit 18, and delegated to the appropriate functional unit 14 by control unit 12. The functional unit 14 retrieves the operand or operands from the register file 20, executes the instruction according to the rounding mode specified by the control register 22, and writes the result of the operation into the register file 20.

The methods and techniques described herein can be implemented in connection with a variety of different processors. For example, the processor 10 can be any of a variety of processor types, such as a reduced instruction set computing (RISC) processor, a complex instruction set computing (CISC) processor, variations of conventional RISC processors or CISC processors, or a very long instruction word (VLIW) processor. The VLIW architecture may include a plurality of instruction slots each having an associated set of functional units 14, and each slot may be adapted to execute one operation of a VLIW instruction. While each slot can have an associated set of functional units 14, only one functional unit 14 in a given slot can be used at any given time.

In some implementations, the VLIW processor allows issue of five operations in each clock cycle according to a set of specific issue rules. The issue rules impose issue time constraints and a result writeback constraint. Issue time constraints result because each operation implies a need for a particular type of functional unit. Accordingly, each operation requires an issue slot that has an instance of the appropriate functional unit type attached. These functional units require time to recover after performing an operation, and during this recovery time, other operations that require a functional unit that is being recovered cannot be performed. Writeback constraints result because no more than five results should be simultaneously written to the register file 20 at any point in time. Any set of operations that meets the issue time and result writeback constraints constitutes a legal instruction.

By way of example, some details of the invention will be described in the context of a VLIW processor. It should be noted, however, that the invention is not limited in implementation to any particular type of processor, and any description of a particular processor type should not be construed to limit the scope of the invention.

Processor 10 typically includes or is used in conjunction with some form of processor readable media. By way of example, and not limitation, processor readable media may comprise computer storage media and/or communication media. Computer storage media includes volatile and nonvolatile, removable and nonremovable media implemented in any method or technology for storage of information such as processor-readable instructions, data structures, program modules, or other data. Computer storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by the processor 10. Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

Figure 2:
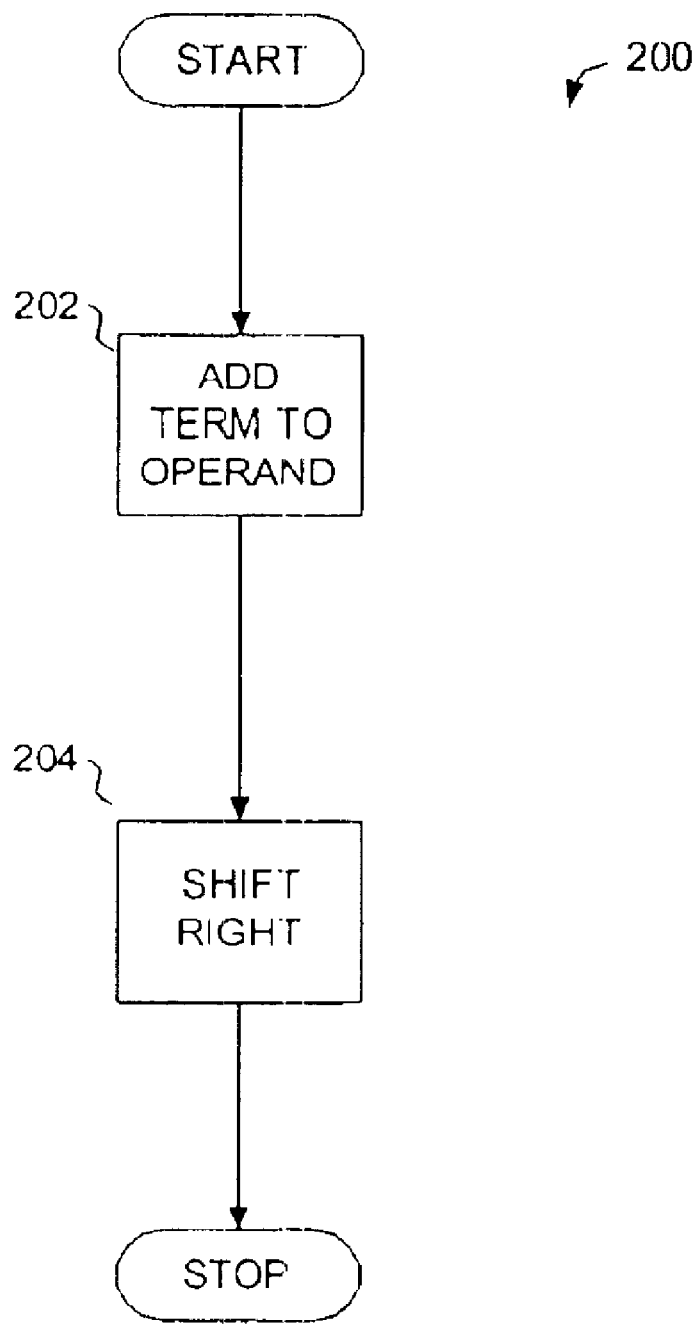
FIGS. 2–15 are flow diagrams illustrating example modes of operation of the programmable processor methods.

FIG. 2 depicts an example mode of operation 200 of processor 10 for performing a shift right operation, according to a particular embodiment of the invention. The shift right operation is typically used to implement integer division by some power of two. For example, shifting three bits to the right has the effect of dividing the integer by eight. The conventional shift right operation rounds down, i.e., toward negative infinity. According to the invention, this conventional operation is supported. In addition, however, the user can select from a variety of alternative rounding modes by setting an integer rounding mode field of a Program Control and Status Word (PCSW) register stored, for example, in the control register 22 of FIG. 1. Assuming the integer rounding mode field contains three bits, eight distinct integer rounding modes are selectable. These rounding modes include:

rounding down (toward negative infinity), rounding up (toward infinity), rounding to the nearest integer, with 0.5 being rounded toward negative infinity, rounding to the nearest integer, with 0.5 being rounded toward infinity, rounding to the nearest integer, with 0.5 being rounded toward zero, rounding to the nearest integer, with 0.5 being rounded away from zero, rounding toward zero, and rounding away from zero.

It should be noted that, if the first rounding mode is selected, the shift right operation with rounding is entirely equivalent to the conventional shift right operation. Depending on the particular rounding mode, the number s of bits shifted, and the sign of the shifted operand, a term is added to the operand to be shifted, as shown at a block 202. Table 1 shows the term that is added in each case, assuming that s is greater than zero. If s is equal to zero, i.e., if no shifting is performed, then no term is added to the operand, and no rounding is applied. The integer rounding mode values listed in Table 1 below are provided for purposes of illustration only.

TABLE 1

| Integer rounding mode value | Rounding mode | Term to be added, positive operand | Term to be added, negative operand |
|---|---|---|---|
| 000 | To negative infinity | 0 | 0 |
| 001 | To nearest, half to negative infinity | $2^{s-1} - 1$ | $2^{s-1} - 1$ |
| 010 | To zero | 0 | $2^s - 1$ |
| 011 | To nearest, half to zero | $2^{s-1} - 1$ | $2^s - 1$ |
| 100 | To infinity | $2^s - 1$ | $2^s - 1$ |
| 101 | To nearest, half to positive infinity | $2^s - 1$ | $2^s - 1$ |
| 110 | Away from zero | $2^s - 1$ | 0 |
| 111 | To nearest, half away from zero | $2^s - 1$ | $2^{s-1} - 1$ |

After the term is added (if applicable), the operand is shifted s bits to the right at a block 204.

As an example, if r10, interpreted as a half-word signed-integer vector, represents the vector (−4, −3, 3, 4) and the integer rounding mode value is 011, i.e., round to the nearest integer, with 0.5 being rounded toward zero, then the result of shifting right by one bit with rounding is (−2, −1, 1, 2). This result is obtained by first adding the term vector (1, 1, 0, 0) to r10 as specified by the integer rounding mode value, resulting in (−3, −2, 3, 4) and then shifting right by one bit, so as to divide by two with rounding toward negative infinity.

Similarly, the result of a multiplication operation has twice as many bits as the operands. Dropping the least significant half of the bits corresponds to dividing the result by a power of two. For example, multiplying two eight-bit operands results in a product having sixteen bits. Dropping the least significant eight bits corresponds to dividing the result by $2^8$, or 64. This operation can also be performed with any of the integer rounding modes described above in connection with Table 1.

Figure 3:
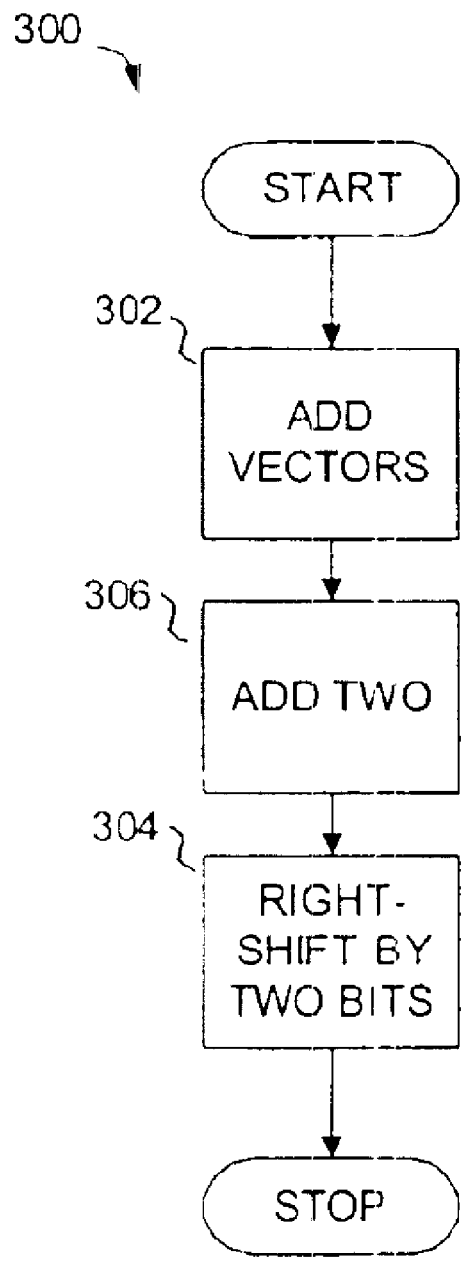

FIG. 3 illustrates an example mode of operation 300 of the processor 10 of FIG. 1 for performing a rounded average of four unsigned-byte vectors, according to another embodiment of the invention. This operation takes the syntax

[if rguard]avg4_bu rsrc1 rsrc2 rsrc3 rsrc4 rdest where rsrc1, rsrc2, rsrc3, rsrc4, and rdest are interpreted as unsigned-byte vectors. In a particular type of VLIW processor, this operation issues from a functional unit of type superdspalu, uses issue slots 3 and 4, and has a latency of two cycles. The operation takes the rounded average of the four unsigned-byte vectors rsrc1, rsrc2, rsrc3, and rsrc4 by adding the vectors at a block 302 and dividing by four, i.e., right-shifting by two bits, at a block 304. Rounded averaging is implemented by adding two prior to the right-shift operation, as shown at a block 306. Although this added quantity is shifted out in connection with block 304, the rounding hardware perceives it as a value of one-half, and applies rounding accordingly. The type of rounding applied depends on the value of an integer rounding mode value, for example, as shown above in Table 1. The rounded averaging operation may make use of an optional guard register, as specified in rguard. If a guard register is present and has a value of TRUE, the operation is performed. If the guard register has a value of FALSE, no operation takes place. By way of example, the operation avg4_bu r10 r20 r30 r40 r50 where r10=0xff_ff_ff_02_63_1e_00_d1 r20=00_01_ff_03_02_00_01_d2 r30=0xff_ff_ff_96_01_1e_00_d1 r40=00_01_ff_01_01_01_01_d2 produces the result r50=0x80_80_ff_27_1a_0f_01_d2.

Figure 4:
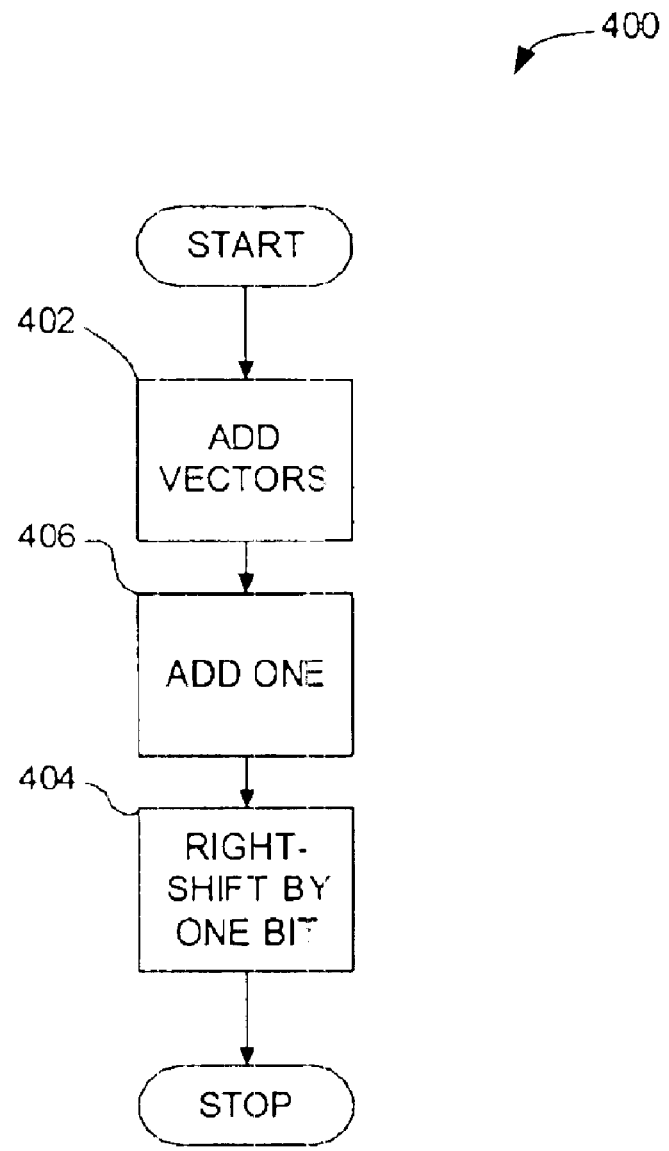

Another operation that can be performed is a rounded average of two unsigned-byte vectors, as shown by the example mode of operation 400 of FIG. 4. This operation takes the syntax

[if rguard]avg_bu rsrc1 rsrc2 rdest where rsrc1, rsrc2, and rdest are interpreted as unsigned-byte vectors. In a particular type of VLIW processor, this operation issues from a functional unit of type dspalu, uses issue slots 3 and 4, and has a latency of two cycles. The operation takes the rounded average of the two unsigned-byte vectors rsrc1 and rsrc2 by adding the vectors at a block 402 and dividing by two, i.e., right-shifting by one bit, at a block 404. Rounded averaging is implemented by adding one prior to the right-shift operation, as shown at a block 406. Although this added quantity is shifted out in connection with block 404, the rounding hardware perceives it as a value of one-half, and applies rounding accordingly. The type of rounding applied depends on the value of an integer rounding mode value, for example, as shown above in Table 1. The rounded averaging operation may make use of an optional guard register, as specified in rguard. If a guard register is present and has a value of TRUE, the operation is performed. If the guard register has a value of FALSE, no operation takes place.

As an example, the operation avg_bu r10 r20 r30 where r10=00_ff_a0_fa_ff_e6_78_0a r20=00_ff_a0_ff_f0_f0_82_14 produces the result r30=00_ff_a0_fd_f8_eb_7d_0f.

Figure 5:
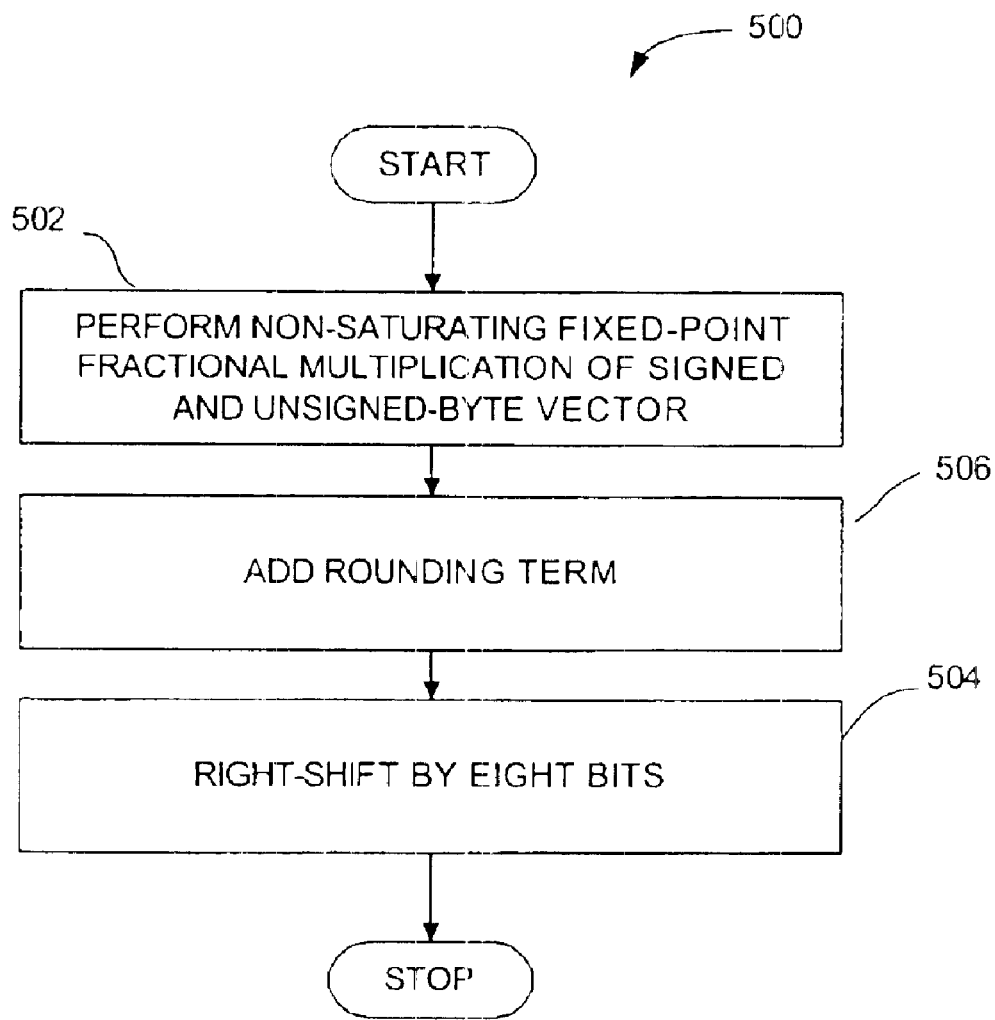

According to another implementation of the invention, the processor is configured to perform a non-saturating fixed-point fractional multiplication operation with rounding of a signed- and an unsigned-byte vector. FIG. 5 depicts an example mode of operation 500 of the processor 10 of FIG. 1 for performing an operation of this type. This operation takes the syntax

[if rguard]mspmul_bsus rsrc1 rsrc2 rdest where rsrc1 and rdest are interpreted as signed-byte vectors and rsrc2 is an unsigned-byte vector. In a particular type of VLIW processor, this operation issues from a functional unit of type mul, uses issue slots 2 and 3, and has a latency of three cycles. For each vector element, this operation performs a non-saturating fixed-point fractional two-quadrant multiplication operation with rounding of a signed-byte vector and an unsigned-byte vector, as shown at a block 502.

The upper eight bits of each 16-bit product are stored in the corresponding element in the rdest register. As described above, dropping the least significant half of the bits corresponds to dividing the result by a power of two. In this case, the lower eight bits are dropped by right-shifting by eight bits, as shown at a block 504. The type of rounding applied depends on the value of an integer rounding mode value, for example, as shown above in Table 1. Depending on the rounding mode, a rounding term, which may be zero, is added to the product at a block 506 prior to right-shifting. The fractional multiplication operation may make use of an optional guard register, as specified in rguard. If a guard register is present and has a value of TRUE, the operation is performed. If the guard register has a value of FALSE, no operation takes place. For example, the operation mspmul_bsus r10 r20 r30 where r10=0xfe_ff_01_80_f0_10_f0_10 r20=0xff_ff_ff_ff_02_02_10_08 and the integer rounding mode value is 000 (i.e., round toward negative infinity) produces the result r30=0xfe_ff_00_80_ff_00_ff_00.

Figure 6:
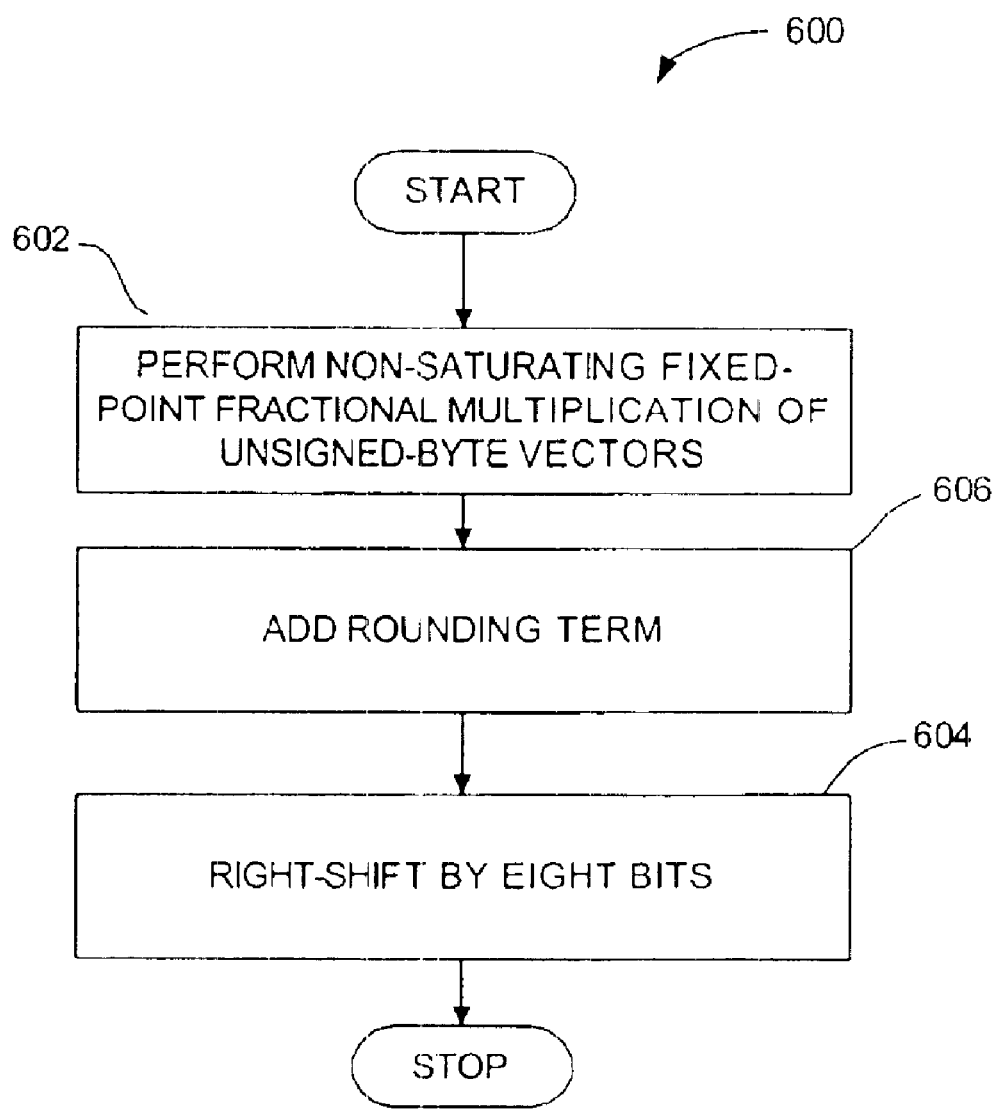

Still another type of operation that can be performed is a non-saturating fixed-point fractional multiplication operation with rounding of two unsigned-byte vectors. FIG. 6 illustrates an example mode of operation 600 of the processor 10 of FIG. 1 for performing such an operation. This operation takes the syntax

[if rguard] mspmul_bu rsrc1 rsrc2 rdest where rsrc1, rsrc2, and rdest are interpreted as unsigned-byte vectors. In a particular type of VLIW processor, this operation issues from a functional unit of type mul, uses issue slots 2 and 3, and has a latency of three cycles. For each vector element, this operation performs a non-saturating fixed-point fractional one-quadrant multiplication operation with rounding of two unsigned-byte vectors, as shown at a block 602.

The upper eight bits of each 16-bit product are rounded and stored in the corresponding element in the rdest register. As described above, dropping the least significant half of the bits corresponds to dividing the result by a power of two. In this case, the lower eight bits are dropped by right-shifting by eight bits, as shown at a block 604. The type of rounding applied depends on the value of an integer rounding mode value, for example, as shown above in Table 1. Depending on the rounding mode, a rounding term is added to the product at a block 606 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_bu r10 r20 r30 where r10=0x10_02_02_80_10_80_ff r20=00_0f_80_ff_02_10_10_01 and the integer rounding mode value is 010 (i.e., round toward zero) produces the result r30=00_00_01_01_01_01_08_00.

Figure 7:
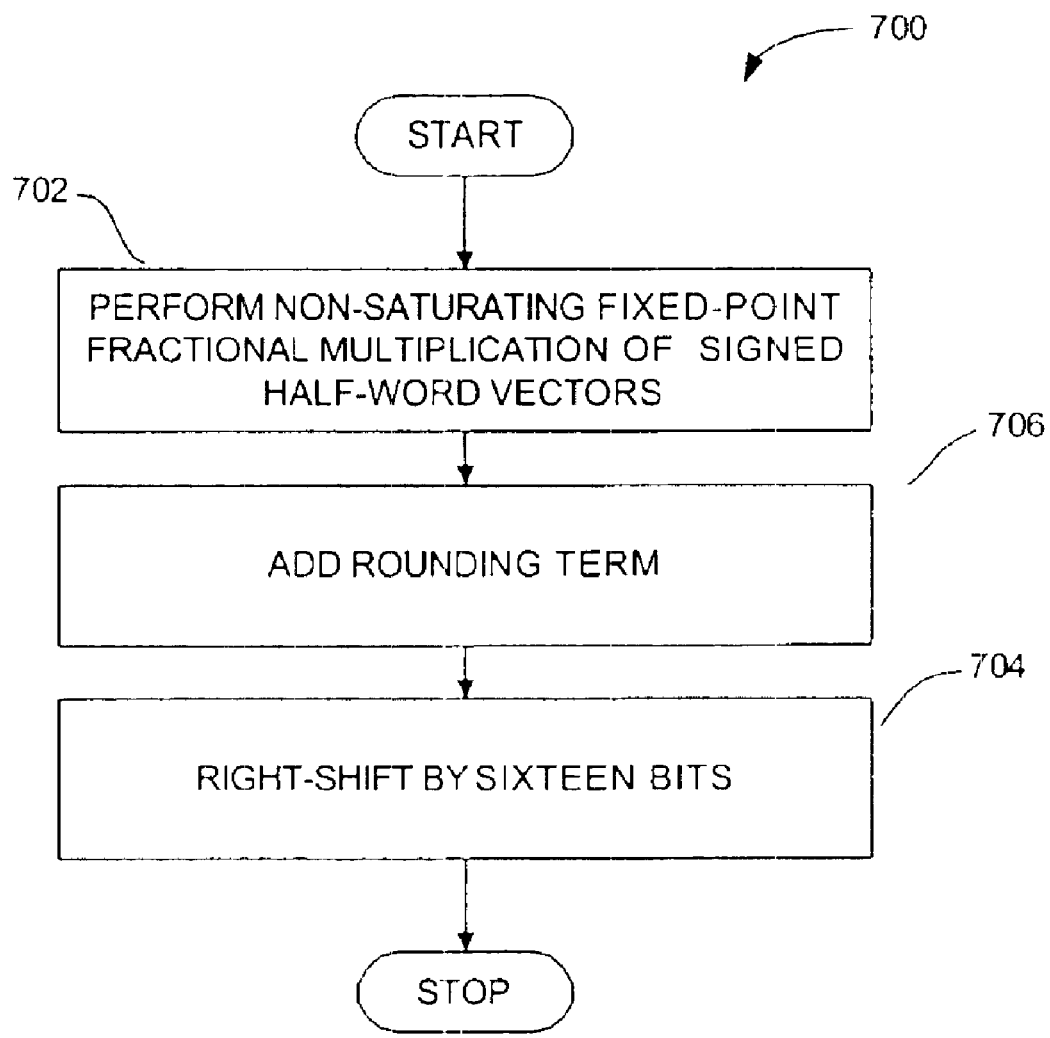

According to still another embodiment, the processor is also configured to perform a non-saturating fixed-point fractional multiplication operation with rounding of two signed half-word vectors, for example, using a mode of operation 700 of FIG. 7. This operation takes the syntax

[if rguard]mspmul_hs rsrc1 rsrc2 rdest where rsrc1, rsrc2, and rdest are interpreted as signed half-word vectors. In a particular type of VLIW processor, this operation issues from a functional unit of type mul, uses issue slots 2 and 3, and has a latency of three cycles. For each vector element, this operation performs a non-saturating fixed-point fractional four-quadrant multiplication operation with rounding of two signed half-word vectors, as shown at a block 702.

The upper sixteen bits of each 32-bit product are rounded and stored in the corresponding element in the rdest register. Dropping the least significant half of the bits corresponds to dividing the result by a power of two. In this case, the lower sixteen bits are dropped by right-shifting by sixteen bits, as shown at a block 704. The type of rounding applied depends on the value of an integer rounding mode value, for example, as shown above in Table 1. Depending on the rounding mode, a rounding term is added to the product at a block 706 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_hs r10 r20 r30 where r10=0x4000_8000_4000_7fff r20=0xfff3_ffff_0002_0001 and the integer rounding mode value is 000 (i.e. round toward negative infinity) produces the result r30=0xffff_0001_0001_0000.

Figure 8:
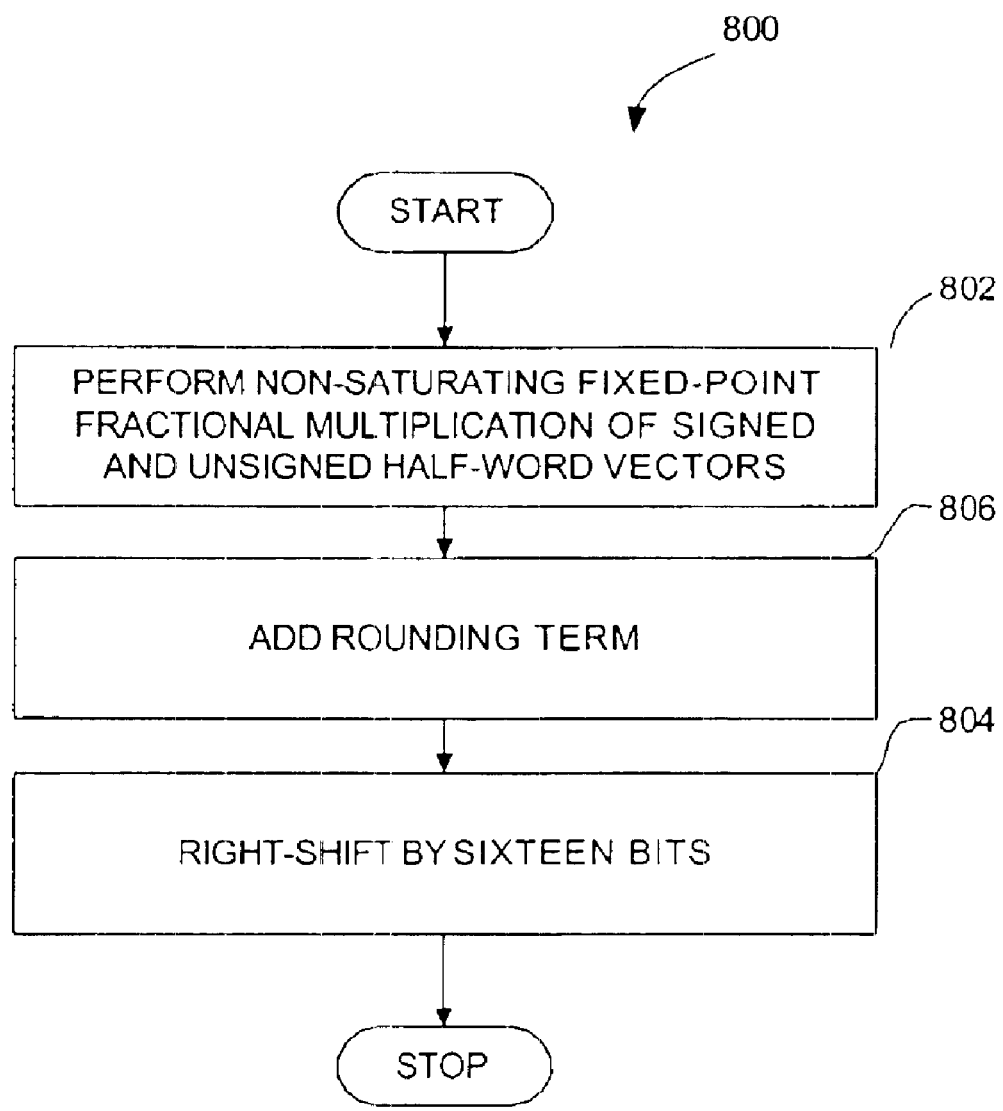

In yet another embodiment, the processor is configured to perform a non-saturating fixed-point fractional multiplication operation with rounding of a signed half-word vector and an unsigned half-word vector, for example, using a mode of operation 800 of FIG. 8. This operation takes the syntax

[if rguard] mspmul_hsus rsrc1 rsrc2 rdest where rsrc1 and rdest are interpreted as signed half-word vectors and rsrc2 is an unsigned half-word vector. In a particular type of VLIW processor, this operation issues from a functional unit of type mul, uses issue slots 2 and 3, and has a latency of three cycles. For each vector element, the operation performs a non-saturating fixed-point fractional two-quadrant multiplication operation with rounding of a signed half-word vector and an unsigned half-word vector, as shown at a block 802. The lower sixteen bits of each 32-bit product are rounded and stored in the corresponding element in the rdest register by right-shifting by sixteen bits, as shown at a block 804. The type of rounding applied depends on the value of an integer rounding mode value, for example, as shown above in Table 1. Depending on the rounding mode, a rounding term is added to the product at a block 806 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_hsus r10 r20 r30 where r10=0x8000_ffff_0002_0100 r20=0xffff_4000_ffff_0040 and the integer rounding mode value is 000 (i.e., round toward negative infinity) produces the result r30=0x8000_ffff_0001_0000.

Figure 9:
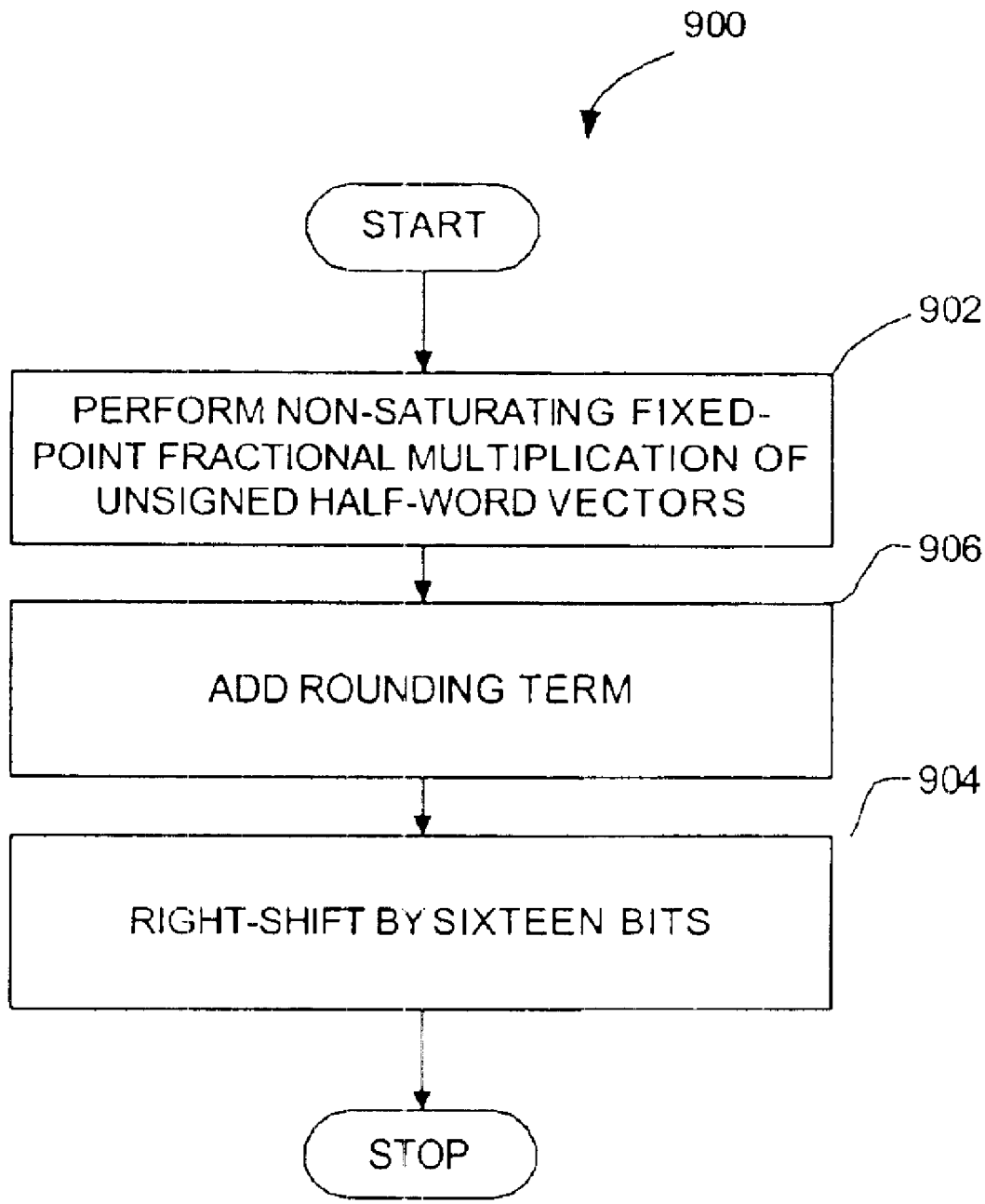

According to still another embodiment, the processor is also configured to perform a non-saturating fixed-point fractional multiplication operation with rounding of two unsigned half-word vectors, for example, using a mode of operation 900 of FIG. 9. This operation takes the syntax

[if rguard] mspmul_hu rsrc1 rsrc2 rdest where rsrc1, rsrc2, and rdest are interpreted as unsigned half-word vectors. In a particular type of VLIW processor, this operation issues from a functional unit of type mul, uses issue slots 2 and 3, and has a latency of three cycles. For each vector element, this operation performs a non-saturating fixed-point fractional one-uadrant multiplication operation with rounding of two unsigned half-word vectors, as shown at a block 902.

The upper sixteen bits of each 32-bit product are rounded and stored in the corresponding element in the rdest register. As described above, dropping the least significant half of the bits corresponds to dividing the result by a power of two. In this case, the lower sixteen bits are dropped by right-shifting by sixteen bits, as shown at a block 904. The type of rounding applied depends on the value of an integer rounding mode value, for example, as shown above in Table 1. Depending on the rounding mode, a rounding term is added to the product at a block 906 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_hu r10 r20 r30 where r10=0xfffe_ffff_ffff_0100 r20=0x01_8000_ffff_0040 and the integer rounding mode value is 010 (i.e., round toward zero) produces the result r30=0000_7fff_fff3_0000.

Figure 10:
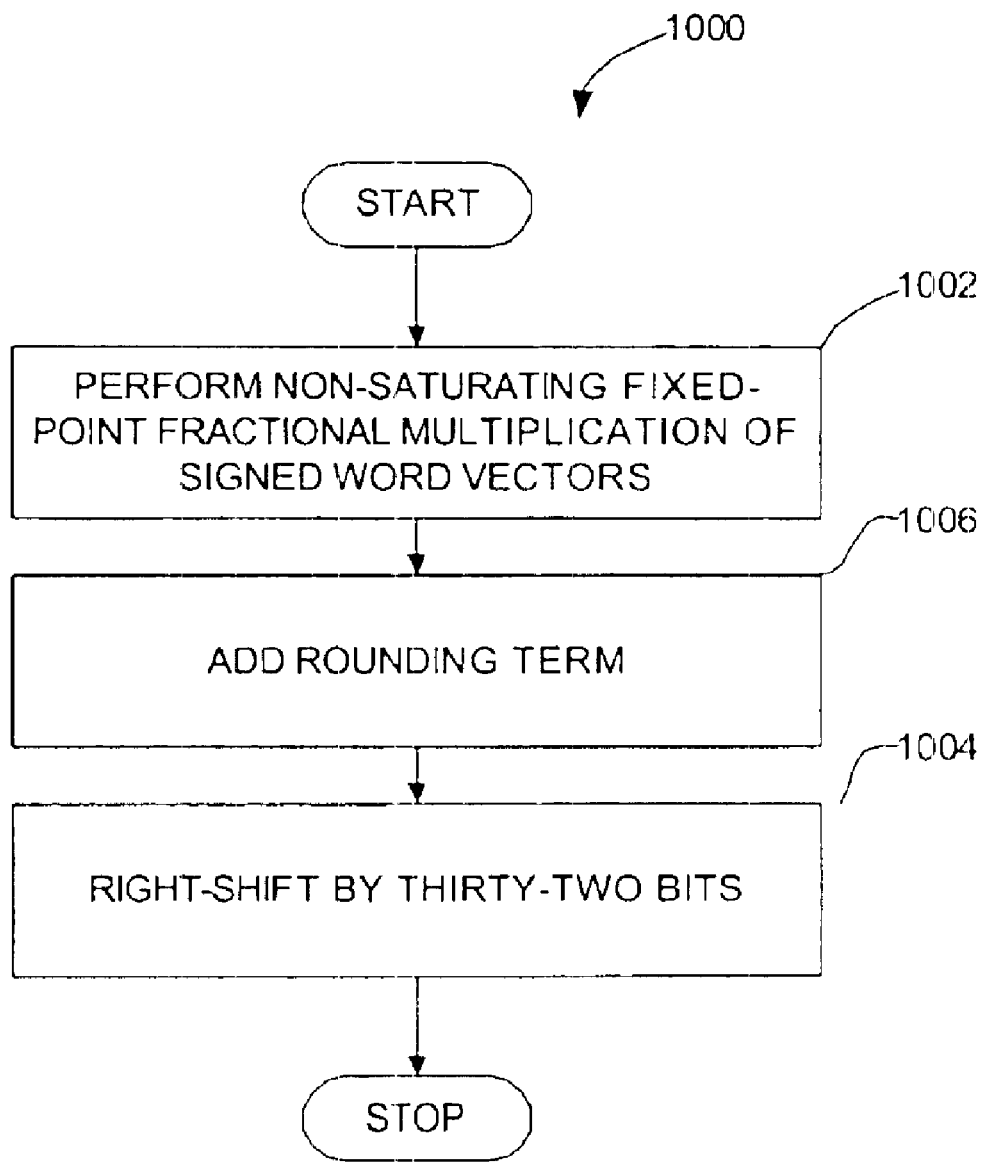

In yet another embodiment, the processor is also configured to perform a non-saturating fixed-point fractional multiplication operation with rounding of two signed word vectors, for example, using a mode of operation 1000 of FIG. 10. This operation takes the syntax

[if rguard] mspmul_ws rsrc1 rsrc2 rdest where rsrc1, rsrc2, and rdest are interpreted as signed word vectors. In a particular type of VLIW processor, this operation issues from a functional unit of type mul, uses issue slots 2 and 3, and has a latency of three cycles. For each vector element, this operation performs a non-saturating fixed-point fractional four-quadrant multiplication operation with rounding of two signed word vectors, as shown at a block 1002.

The upper thirty-two bits of each 64-bit product are rounded and stored in the corresponding element in the rdest register. Dropping the least significant half of the bits corresponds to dividing the result by a power of two. In this case, the lower thirty-two bits are dropped by right-shifting by thirty-two bits, as shown at a block 1004. The type of rounding applied depends on the value of an integer rounding mode value, for example, as shown above in Table 1. Depending on the rounding mode, a rounding term is added to the product at a block 1006 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_ws r10 r20 r30 where r10=0x004000_ffff_8000 r20=0x7fffffffe_ffffff and the integer rounding mode value is 000 (i.e., round toward negative infinity) produces the result r30=0xfffffffe_00000000.

Figure 11:
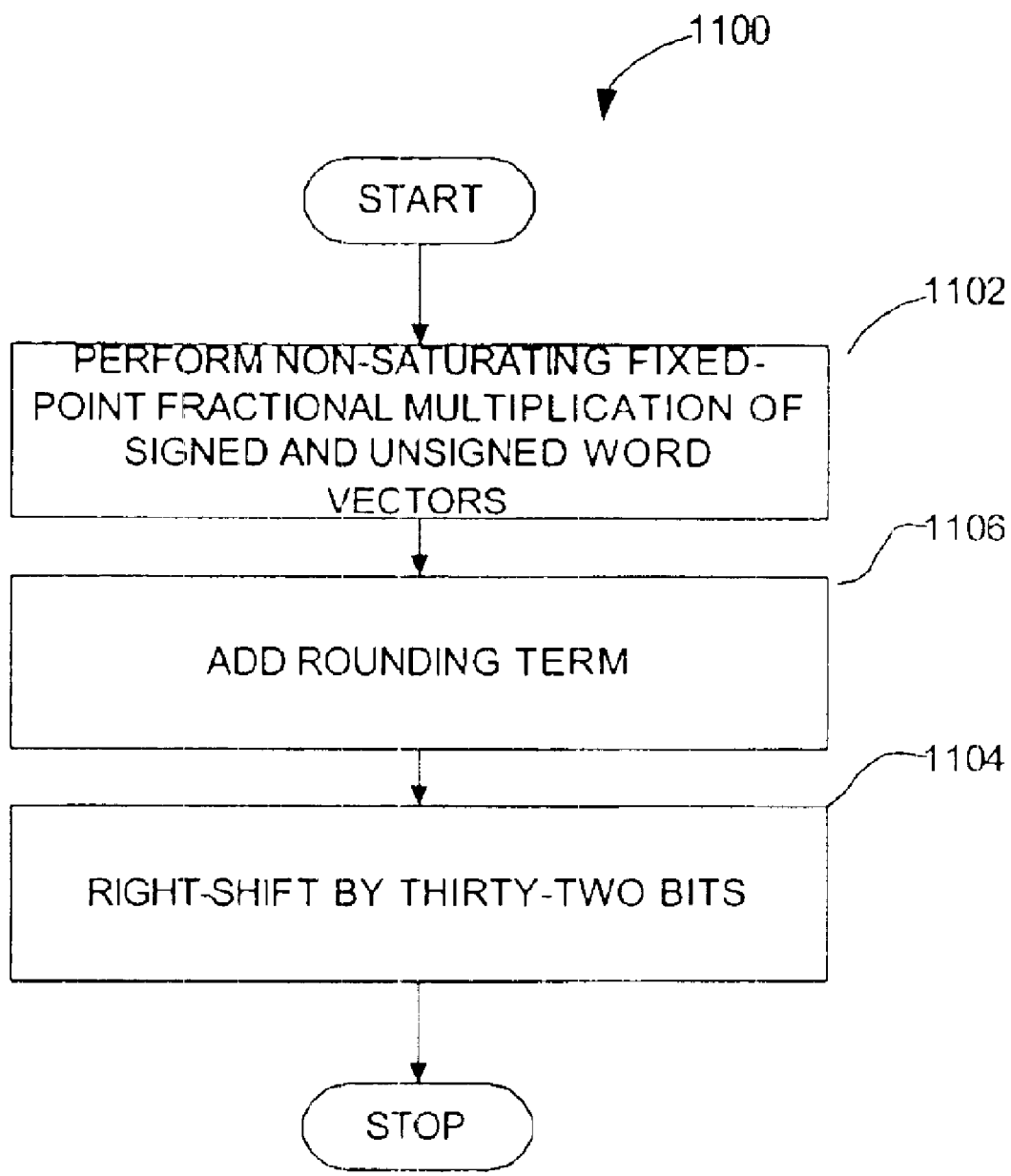

The processor can also be configured to perform a non-saturating fixed-point fractional multiplication operation with rounding of a signed word vector and an unsigned word vector, for example, using a mode of operation 100 of FIG. 11. This operation takes the syntax

[if rguard] mspmul_wsus rsrc1 rsrc2 rdest where rsrc1 and rdest are interpreted as signed word vectors and rsrc2 is an unsigned word vector. In a particular type of VLIW processor, this operation issues from a functional unit of type mul, uses issue slots 2 and 3, and has a latency of three cycles. For each vector element, the operation performs a non-saturating fixed-point fractional two-quadrant multiplication operation with rounding of a signed word vector and an unsigned word vector, as shown at a block 1102.

The lower sixteen bits of each 32-bit product are rounded and stored in the corresponding element in the rdest register by sixteen bits, as shown at a block 1104. The type of rounding applied depends on the value of an integer rounding mode value, for example, as shown above in Table 1. Depending on the rounding mode, a rounding term is added to the product at a block 1106 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_wsus r10 r20 r30 where r10=0x80000000 r20=0xffffffff and the integer rounding mode value is 000 (i.e., round toward negative infinity) produces the result r30=0xc0000000.

As another example, assuming r10=0xffffffff_80000000 r20=0x80000000_7fffffff.

the same operation produces the result r30=0xffffffff_ffffffff.

Figure 12:
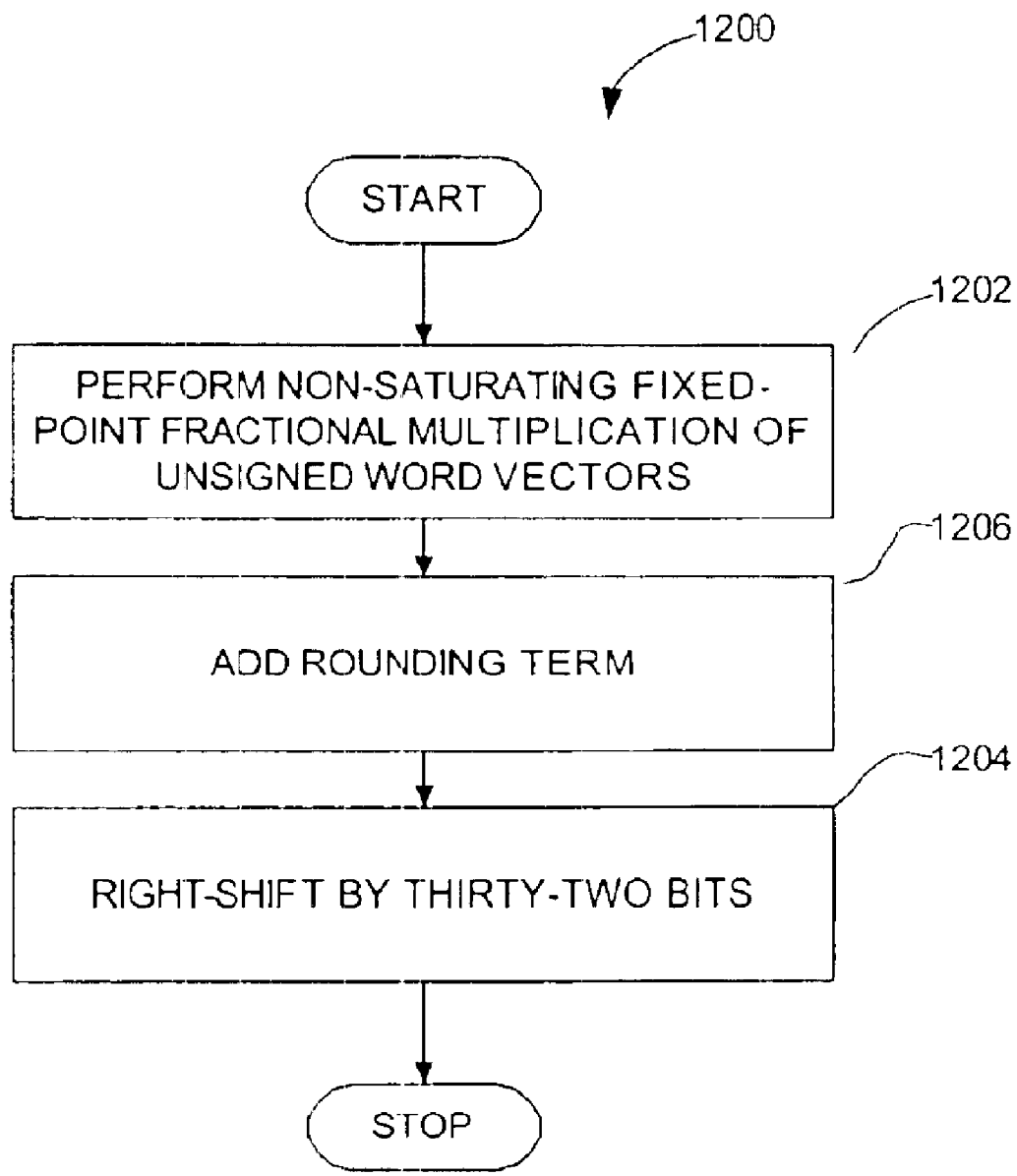

The processor can also be configured to perform a non-saturating fixed-point fractional multiplication operation with rounding of two unsigned word vectors, for example, using a mode of operation 1200 of FIG. 12. This operation takes the syntax

[if rguard] mspmul_wu rsrc1 rsrc2 rdest where rsrc1, rsrc2, and rdest are interpreted as unsigned word vectors. In a particular type of VLIW processor, this operation issues from a functional unit of type mul, uses issue slots 2 and 3, and has a latency of three cycles. For each vector element, this operation performs a non-saturating fixed-point fractional one-quadrant multiplication operation with rounding of two unsigned word vectors, as shown at a block 1202. The upper thirty-two bits of each 64-bit product are rounded and stored in the corresponding element in the rdest register.

As described above, dropping the least significant half of the bits corresponds to dividing the result by a power of two. In this case, the lower thirty-two bits are dropped by right-shifting by thirty-two bits, as shown at a block 1204. The type of rounding applied depends on the value of an integer rounding mode value, for example, as shown above in Table 1. Depending on the rounding mode, a rounding term is added to the product at a block 1206 prior to right-shifting. The fractional multiplication operation may make use of an optional guard register, as specified in rguard. If a guard register is present and has a value of TRUE, the operation is performed. If the guard register has a value of FALSE, no operation takes place.

For example, the operation mspmul_wu r10 r20 r30 where r10=0x80000000_80000001 r20=0x80000000_ffffffff and the integer rounding mode value is 010 (i.e., round toward zero) produces the result r30=0x40000000_80000000.

Figure 13:
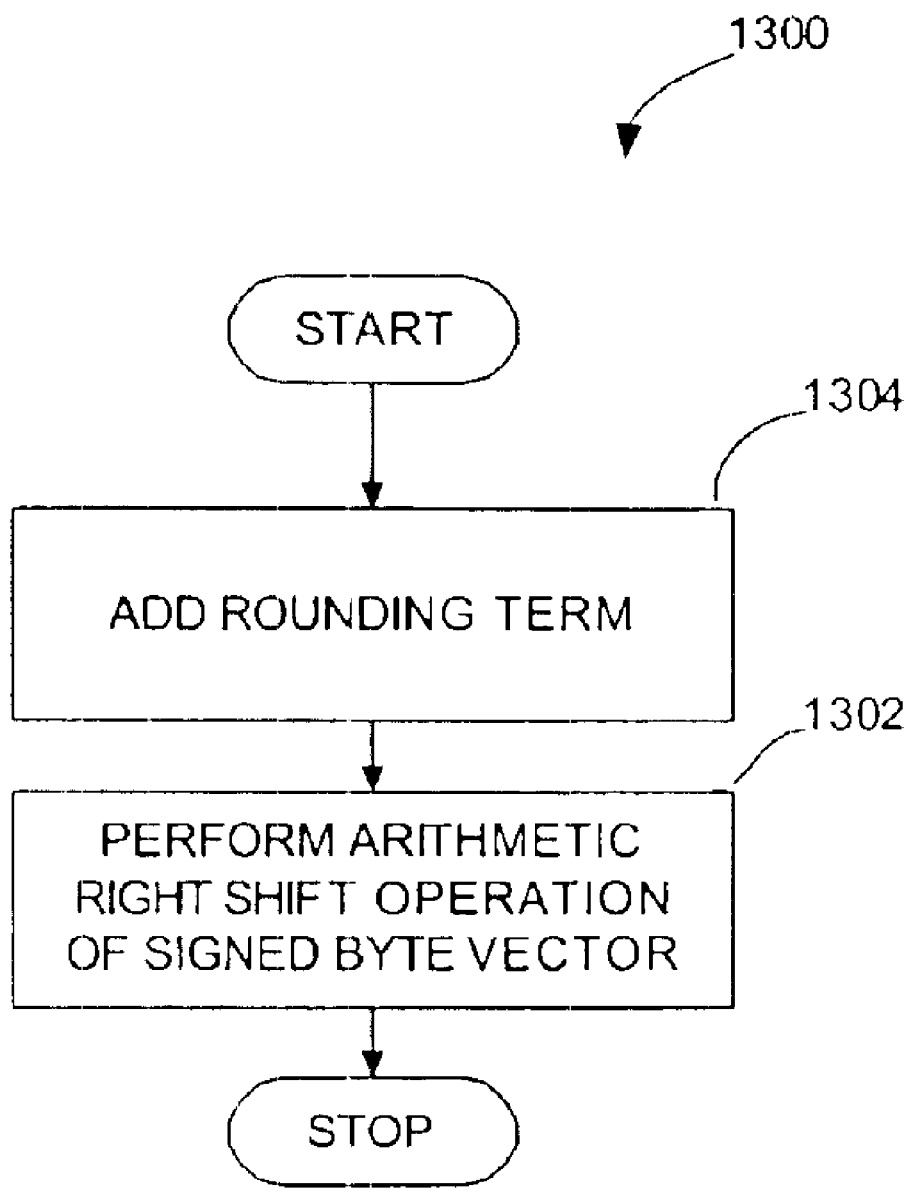

In another particular embodiment of the invention, the processor is further configured to perform an arithmetic right-shift of a signed-byte vector by an immediate shift amount with rounding. This operation can be performed, for example, using a mode of operation 1300 of FIG. 13. The operation takes the syntax

[if rguard]sriround_bs (s) rsrc1 rdest where rsrc1 and rdest are interpreted as signed byte vectors and s is an immediate argument in the range of 0 to 7. In a particular type of VLIW processor, this operation issues from a functional unit of type shift_round, uses issue slots 1 and 2, and has a latency of two cycles. For each destination element, the operation performs an arithmetic, i.e., sign extending right-shift operation on the corresponding element of rsrc1 depending on the value of the immediate argument s, as shown at a block 1302. The type of rounding applied depends on the value of an integer rounding mode value, for example, as shown above in Table 1. Depending on the rounding mode, a rounding term is added to the operand at a block 1304 before shifting is performed. The operation may make use of an optional guard register, as specified in rguard. If a guard register is present and has a value of TRUE, the operation is performed. If the guard register has a value of FALSE, no operation takes place.

By way of example, the operation sriround_bs (2) r10 r20 where r10=0x04_03_02_01_00_ff_fe_fd and the integer rounding mode value is 011 (i.e., round to the nearest integer, with half being rounded to zero) produces the result r20=0x01_01_00_00_00_00_00_ff.

On the other hand, the same operation with the integer rounding mode value set to 101 (i.e., round to the nearest integer, with half being rounded toward positive infinity) produces the result r20=0x01_01_01_00_00_00_00_ff.

With the integer rounding mode value set to 001 (i.e., round to the nearest integer, with half being rounded toward negative infinity), the result is instead r20=0x01_01_00_00_00_00_ff_ff.

Figure 14:
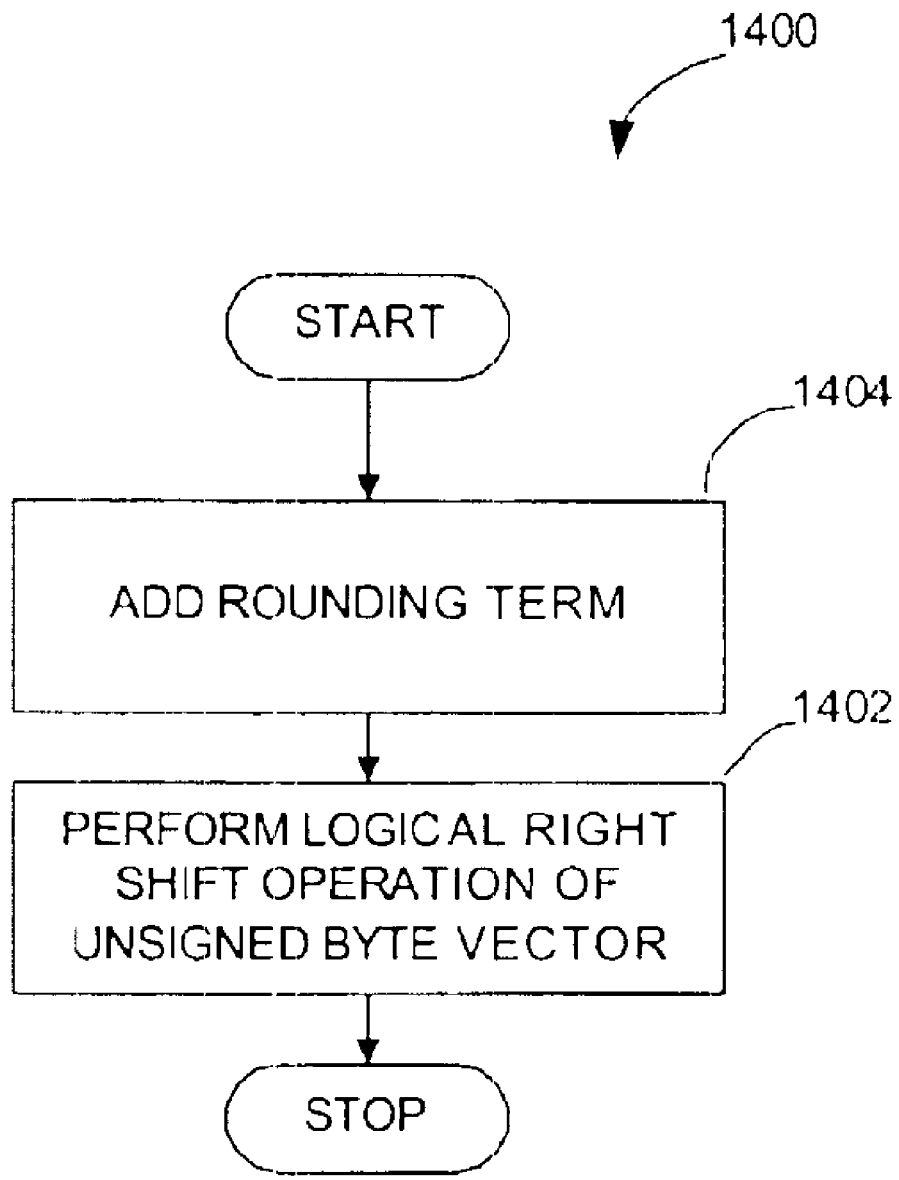

In still another embodiment of the invention, the processor is further configured to perform a logical right-shift of an unsigned-byte vector by an immediate shift amount with rounding. This operation can be performed, for example, using a mode of operation 1400 of FIG. 14. The operation takes the syntax

[if rguard] sriround_bu (s) rsrc1 rdest where rsrc1 and rdest are interpreted as unsigned byte vectors and s is an immediate argument in the range of 0 to 7. In a particular type of VLIW processor, this operation issues from a functional unit of type shift_round, uses issue slots 1 and 2, and has a latency of two cycles. For each destination element, the operation performs a logical, i.e., zero extending right-shift, operation on the corresponding element of rsrc1 depending on the value of the immediate argument s, as shown at a block 1402. The type of rounding applied depends on the value of an integer rounding mode value, for example, as shown above in Table 1. Depending on the rounding mode, a rounding term is added to the operand at a block 1404 before shifting is performed. The operation may make use of an optional guard register, as specified in rguard. If a guard register is present and has a value of TRUE, the operation is performed. If the guard register has a value of FALSE, no operation takes place.

As an example, the operation sriround_bu (2) r10 r20 where r10=0x07_06_05_04_03_02_01_00 and the integer rounding mode value is 011 (i.e., round to the nearest integer, with half being rounded to zero) produces the result r20=0x02_01_01_01_01_00_00_00.

On the other hand, the same operation with the integer rounding mode value set to 101 (i.e., round to the nearest integer, with half being rounded toward positive infinity) produces the result r20=0x02_02_01_01_01_01_00_00.

With the integer rounding mode value set to 001 (i.e., round to the nearest integer, with half being rounded toward negative infinity), the result is instead r20=0x02_01_01_01_01_00_00_00.

Figure 15:
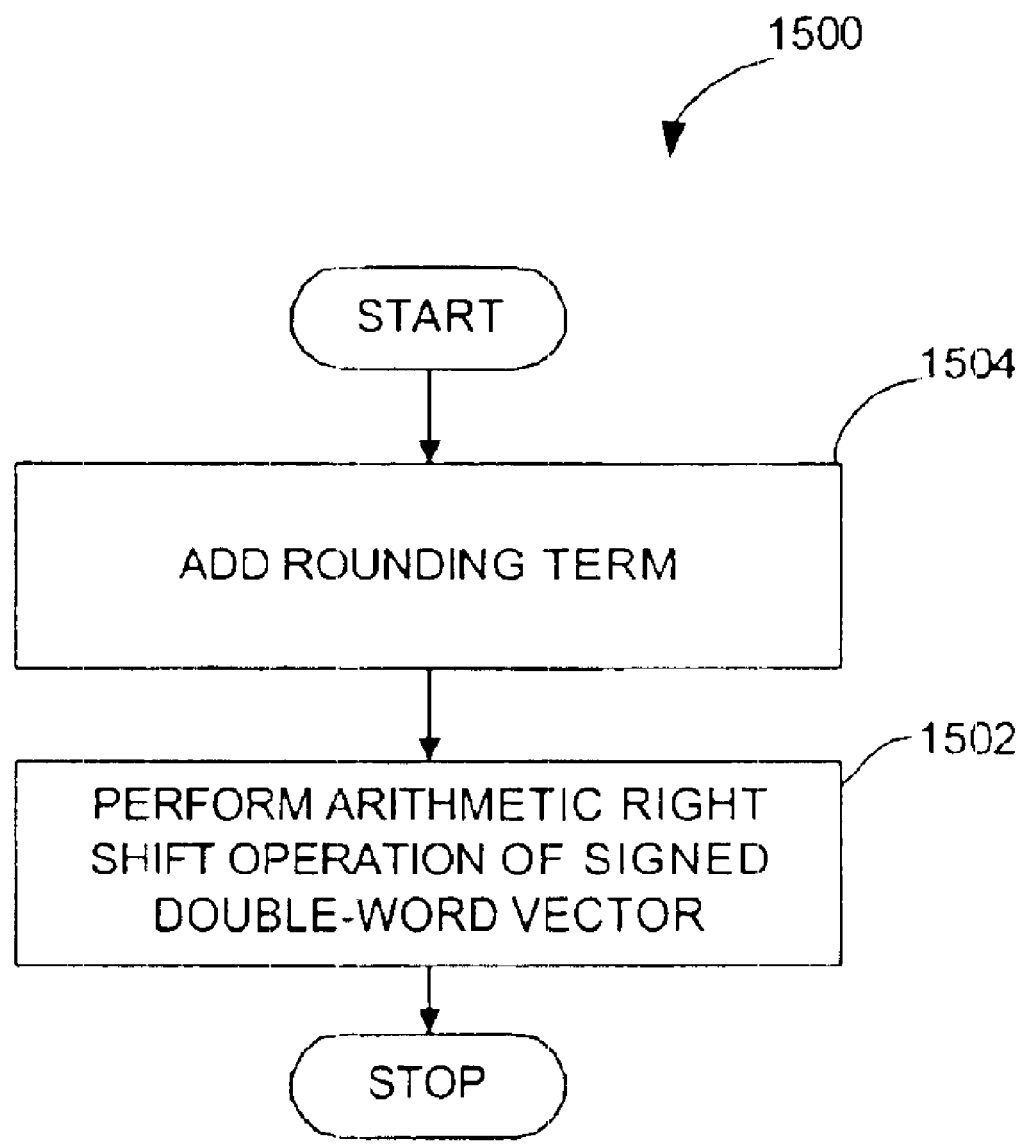

Another operation that can be performed is an arithmetic right-shift of a signed double word by an immediate shift amount with rounding. This operation can be performed, for example, using a mode of operation 1500 of FIG. 15. The operation takes the syntax

[if rguard] sriround_ds (s) rsrc1 rdest where rsrc1 and rdest are interpreted as signed double word vectors and s is an immediate argument in the range of 0 to 63. In a particular type of VLIW processor, this operation issues from a functional unit of type shift_round, uses issue slots 1 and 2, and has a latency of two cycles. For each destination element, the operation performs an arithmetic, i.e., sign extending right-shift operation on the corresponding element of rsrc1 depending on the value of the immediate argument s, as shown at a block 1502. The type of rounding applied depends on the value of an integer rounding mode value, for example, as shown above in Table 1. Depending on the rounding mode, a rounding term is added to the operand at a block 1504 before shifting is performed. The operation may make use of an optional guard register, as specified in rguard. If a guard register is present and has a value of TRUE, the operation is performed. If the guard register has a value of FALSE, no operation takes place.

By way of example, the operation sriround_ds (2) r10 r20 where r10=0xffffffff_fffffffd and the integer rounding mode value is 011 (i.e., round to the nearest integer, with half being rounded to zero) produces the result r20=0xffffffff_ffffffff.

The same result is obtained with the integer rounding mode value set to 101 (i.e., round to the nearest integer, with half being rounded toward positive infinity) or 001. With the integer rounding mode value set to 010 (i.e., round toward zero), the result is instead r20=0x0_0.

Figure 16:
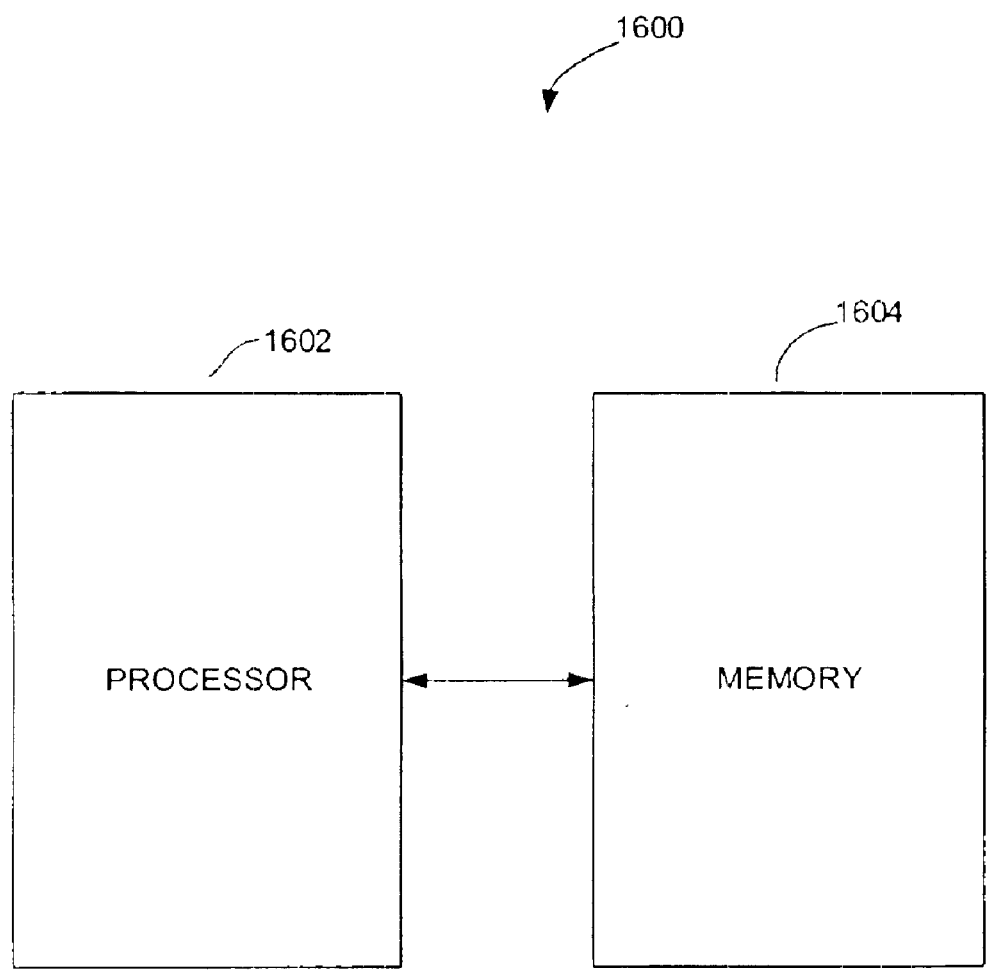
FIG. 16 is a block diagram illustrating the programmable processor within a computing system.

According to another embodiment of the invention, any of the integer rounding operations described above in connection with FIGS. 2–15 can be implemented in a system 1600 of FIG. 16. The system 1600 includes a processor 1602, such as the processor 10 of FIG. 1, and a memory 1604.

Various methods for performing integer rounding operations in a computer processor have been described. Besides conventional rounding operations, i.e., rounding down toward negative infinity in all cases, alternative rounding modes can be specified. Depending in part on the particular rounding mode used and on the sign of the value to be rounded, a rounding term is added to the value to be rounded before right-shifting is performed. Adding the rounding term ensures that the desired result is obtained.

It is to be understood that, even though numerous characteristics and advantages of various embodiments of the invention have been set forth in the foregoing description, together with details of the structure and function of various embodiments of the invention, this disclosure is illustrative only, and changes may be made within the principles of the invention to the fill extent indicated by the broad general meaning of the terms in which the appended claims are expressed.

What is claimed is:

1. A method comprising:
   executing two separate instructions in a programmable processor, comprising:
   executing a first instruction in the programmable processor to set a rounding mode; and
   executing a second instruction within the programmable processor to generate an integer result rounded according to the rounding mode, wherein the second instruction does not designate the rounding mode.

2. The method of claim 1, wherein executing the second instruction comprises executing an instruction that performs a rounded averaging operation.

3. The method of claim 1, wherein executing the second instruction comprises executing an instruction that performs a non-saturating, fixed-point fractional multiplication operation with rounding.

4. The method of claim 1, wherein executing the second instruction comprises executing an instruction that performs a right-shift operation with rounding.

5. The method of claim 1, wherein executing the first instruction comprises executing an instruction that sets a rounding mode selected from a group of rounding modes comprising:
   rounding toward negative infinity;
   rounding toward infinity;
   rounding toward zero;
   rounding away from zero;
   rounding to a nearest integer, with a value of one-half being rounded toward negative infinity;
   rounding to a nearest integer, with a value of one-half being rounded toward infinity;
   rounding to a nearest integer, with a value of one-half being rounded toward zero; and
   rounding to a nearest integer, with a value of one-half being rounded away from zero.

6. The method of claim 1, wherein the second instruction includes an arithmetic right-shift operation on a vector operand by an immediate shift amount with rounding, and wherein the vector operand comprises a signed byte vector, an unsigned byte vector, a signed double word or an unsigned double word.

7. A method comprising:
   executing a first instruction to set a rounding mode;
   performing an operation within a programmable processor to produce a result according to a second instruction, wherein the second instruction does not designate the rounding mode;
   adding a rounding term to the result to obtain an intermediate result, the rounding term determined at least in part as a function of the rounding mode and a shift amount; and
   right-shifting the intermediate result by the shift amount.

8. The method of claim 7, wherein executing the first instruction comprises executing an instruction that sets a rounding mode selected from the group of rounding modes comprising:
   rounding toward negative infinity;
   rounding toward infinity;
   rounding toward zero;
   rounding away from zero;
   rounding to a nearest integer, with a value of one-half being rounded toward negative infinity;
   rounding to a nearest integer, with a value of one-half being rounded toward infinity;
   rounding to a nearest integer, with a value of one-half being rounded toward zero; and
   rounding to a nearest integer, with a value of one-half being rounded away from zero.

9. The method of claim 7, wherein the operation is a rounded averaging operation of two or four unsigned byte vectors.

10. The method of claim 7, wherein the operation is a non-saturating fixed-point fractional multiplication operation with rounding of a set of vector operands selected from signed half-word vectors, unsigned half-word vectors, signed word vectors and unsigned word vectors.

11. A method of compiling a processor-readable software program comprising parsing a software program to produce instructions executable by a programmable processor, wherein the instructions include two separate instructions, comprising a first instruction that sets a rounding mode, and a second instruction that performs an arithmetic operation yielding an integer result rounded according to the rounding mode, wherein the second instruction does not designate the rounding mode.

12. The method of claim 11, wherein the second instruction performs a rounded averaging operation.

13. The method of claim 11, wherein the second instruction performs a non-saturating fixed-point fractional multiplication operation with rounding.

14. The method of claim 11, wherein the second instruction performs a right-shift operation with rounding.

15. The method of claim 11, wherein the first instruction sets a rounding mode selected from the group of rounding modes comprising:
   rounding toward negative infinity;
   rounding toward infinity;
   rounding toward zero;
   rounding away from zero;
   rounding to a nearest integer, with a value of one-half being rounded toward negative infinity;
   rounding to a nearest integer, with a value of one-half being rounded toward infinity;
   rounding to a nearest integer, with a value of one-half being rounded toward zero; and
   rounding to a nearest integer, with a value of one-half being rounded away from zero.

16. The method of claim 11, wherein the arithmetic operation is an arithmetic right-shift operation on a vector operand by an immediate shift amount with rounding, wherein the vector operand comprises a signed byte vector, an unsigned byte vector, a signed double word or an unsigned double word.

17. A method of compiling a processor-readable software program comprising parsing a software program to produce instructions executable by a programmable processor, wherein the instructions cause the programmable processor to:
   execute a first instruction to set a rounding mode;
   perform an arithmetic operation according to a second instruction, wherein the second instruction does not designate the rounding mode;
   add a rounding term to a result of the arithmetic operation to obtain an intermediate result, the rounding term determined at least in part as a function of the rounding mode and a shift amount; and
   right-shift the intermediate result by the shift amount.

18. The method of claim 17, wherein executing the first instruction comprises executing an instruction that sets a rounding mode selected from the group of rounding modes comprising:

rounding toward negative infinity;

rounding toward infinity;

rounding toward zero;

rounding away from zero;

rounding to a nearest integer, with a value of one-half being rounded toward negative infinity;

rounding to a nearest integer, with a value of one-half being rounded toward infinity;

rounding to a nearest integer, with a value of one-half being rounded toward zero; and rounding to a nearest integer, with a value of one-half being rounded away from zero.

19. The method of claim 17, wherein the arithmetic operation is a rounded averaging operation of two or four unsigned byte vectors.

20. The method of claim 17, wherein the arithmetic operation is a non-saturating fixed-point fractional multiplication operation with rounding of a set of vector operands selected from signed half-word vectors, unsigned half-word vectors, signed word vectors and unsigned word vectors.

21. A processor-readable medium having processor-executable instructions for:

executing two separate instructions in a programmable processor, comprising:

executing a first instruction in the programmable processor to set a rounding mode; and executing a second instruction within the programmable processor to generate an integer result rounded according to the rounding mode, wherein the second instruction does not designate the rounding mode.

22. The processor-readable medium of claim 21, wherein executing the second instruction comprises executing an instruction that performs a rounded averaging operation.

23. The processor-readable medium of claim 21, wherein executing the second instruction comprises executing an instruction that performs a non-saturating fixed-point fractional multiplication operation with rounding.

24. The processor-readable medium of claim 21, wherein executing the second instruction comprises executing an instruction that performs a right-shift operation with rounding.

25. The processor-readable medium of claim 21, wherein executing the first instruction comprises executing an instruction that sets a rounding mode selected from the group of rounding modes comprising:

rounding toward negative infinity;

rounding toward infinity;

rounding toward zero;

rounding away from zero;

rounding to a nearest integer, with a value of one-half being rounded toward negative infinity;

rounding to a nearest integer, with a value of one-half being rounded toward infinity;

rounding to a nearest integer, with a value of one-half being rounded toward zero; and rounding to a nearest integer, with a value of one-half being rounded away from zero.

26. The processor-readable medium of claim 21, wherein the second instruction includes an arithmetic right-shift operation on a vector operand by an immediate shift amount with rounding, wherein the vector operand comprises a signed byte vector, an unsigned byte vector, a signed double word or an unsigned double word.

27. A processor-readable medium having processor-executable instructions for:

executing a first instruction to set a rounding mode;

performing an arithmetic operation according to a second instruction, wherein the second instruction does not designate the rounding mode;

adding a rounding term to a result of the arithmetic operation to obtain an intermediate result, the rounding term determined at least in part as a function of the rounding mode and a shift amount; and right-shifting the intermediate result by the shift amount.

28. The processor-readable medium of claim 27, wherein executing the first instruction comprises executing an instruction that sets a rounding mode selected from the group of rounding modes comprising:

rounding toward negative infinity;

rounding toward infinity;

rounding toward zero;

rounding away from zero;

rounding to a nearest integer, with a value of one-half being rounded toward negative infinity;

rounding to a nearest integer, with a value of one-half being rounded toward infinity;

rounding to a nearest integer, with a value of one-half being rounded toward zero; and rounding to a nearest integer, with a value of one-half being rounded away from zero.

29. The processor-readable medium of claim 27, wherein the arithmetic operation is a rounded averaging operation of two or four unsigned byte vectors.

30. The processor-readable medium of claim 27, wherein the arithmetic operation is a non-saturating fixed-point fractional multiplication operation with rounding of a set of vector operands selected from signed half-word vectors, unsigned half-word vectors, signed word vectors and unsigned word vectors.

31. A processor, comprising:

a control register to store a rounding mode of a first instruction;

a functional unit; and a control unit to direct the functional unit to perform an arithmetic function according to the rounding mode in response to a second instruction, wherein the second instruction does not designate the rounding mode.

32. The processor of claim 31, wherein the second instruction comprises a rounded averaging operation.

33. The processor of claim 31, wherein the second instruction comprises a non-saturating fixed-point fractional multiplication operation with rounding.

34. The processor of claim 31, wherein the second instruction comprises a right-shift operation with rounding.

35. The processor of claim 31, further comprising:

a fetch unit configured to receive an instruction from an instruction stream;

a decode unit configured to decode the received instruction; and a register file coupled to the plurality of functional units and configured to store an result.

36. The processor of claim 31, wherein the first instruction sets a rounding mode selected from the group of rounding modes comprising:

rounding toward negative infinity;
rounding toward infinity;
rounding toward zero;
rounding away from zero;
rounding to a nearest integer, with a value of one-half being rounded toward negative infinity;
rounding to a nearest integer, with a value of one-half being rounded toward infinity;
rounding to a nearest integer, with a value of one-half being rounded toward zero; and
rounding to a nearest integer, with a value of one-half being rounded away from zero.

37. The processor of claim 31, wherein the arithmetic operation is an arithmetic right-shift operation on a vector operand by an immediate shift amount with rounding, wherein the vector operand comprises a signed byte vector, an unsigned byte vector, a signed double word or an unsigned double word.

38. A processor, comprising:
a control unit comprising a control register configured to store a representation of a selected rounding mode designated by a first instruction;
at least one functional unit coupled to the control register;
a fetch unit configured to receive a second instruction from an instruction stream;
a decode unit configured to decode the second instruction; and
a register file coupled to the plurality of functional units, the control unit configured to
perform an arithmetic operation according to the second instruction, wherein the second instruction does not designate the rounding mode,
add a rounding term to a result of the arithmetic operation to obtain an intermediate result, the rounding term determined at least in part as a function of the selected rounding mode and a shift amount,
right-shift the intermediate result by the shift amount to generate a rounded result, and
store the rounded result in the register file.

39. The processor of claim 38, wherein the control unit is further configured to execute the first instruction to set the rounding mode.

40. The processor of claim 39, wherein the first instruction sets a rounding mode selected from the group of rounding modes comprising:
rounding toward negative infinity;
rounding toward infinity;
rounding toward zero;
rounding away from zero;
rounding to a nearest integer, with a value of one-half being rounded toward negative infinity;
rounding to a nearest integer, with a value of one-half being rounded toward infinity;
rounding to a nearest integer, with a value of one-half being rounded toward zero; and
rounding to a nearest integer, with a value of one-half being rounded away from zero.

41. The processor of claim 38, wherein the arithmetic operation is a rounded averaging operation of two or four unsigned byte vectors.

42. The processor of claim 38, wherein the arithmetic operation comprises performing a non-saturating fixed-point fractional multiplication operation with rounding of a set of vector operands selected from signed half-word vectors, unsigned half-word vectors, signed word vectors and unsigned word vectors.

43. A system comprising:
a memory; and
a processor comprising
a control register to store a rounding mode of a first instruction,
a functional unit, and
a control unit to direct the functional unit to perform an arithmetic function according to the rounding mode in response to a second instruction, wherein the second instruction does not designate the rounding mode.

44. The system of claim 43, wherein the second instruction comprises a rounded averaging operation.

45. The system of claim 43, wherein the second instruction comprises a non-saturating fixed-point fractional multiplication operation with rounding of a set of vector operands selected from signed half-word vectors, unsigned half-word vectors, signed word vectors and unsigned word vectors.

46. The system of claim 43, wherein the second instruction comprises a right-shift operation with rounding.

47. The system of claim 43, wherein the rounding mode is selected from the group of rounding modes comprising:
rounding toward negative infinity;
rounding toward infinity;
rounding toward zero;
rounding away from zero;
rounding to a nearest integer, with a value of one-half being rounded toward negative infinity;
rounding to a nearest integer, with a value of one-half being rounded toward infinity;
rounding to a nearest integer, with a value of one-half being rounded toward zero; and
rounding to a nearest integer, with a value of one-half being rounded away from zero.

48. The system of claim 43, wherein the second instruction includes an arithmetic right-shift operation on a vector operand by an immediate shift amount with rounding, wherein the vector operand comprises a signed byte vector, an unsigned byte vector, a signed double word or an unsigned double word.

49. A system, comprising:
a memory; and
a control unit comprising a control register configured to store a representation of a selected rounding mode designated by a first instruction;
at least one functional unit coupled to the control register;
a fetch unit configured to receive a second instruction from an instruction stream;
a decode unit configured to decode the second instruction; and
a register file coupled to the plurality of functional units, the control unit configured to
perform an arithmetic operation according to the second instruction, wherein the second instruction does not designate the rounding mode,
add a rounding term to a result of the arithmetic operation to obtain an intermediate result, the rounding term determined at least in part as a function of the selected rounding mode and a shift amount, right-shift the intermediate result by the shift amount to generate a rounded result, and store the rounded result in the register file.

50. The system of claim 49, wherein the processor is further configured to execute the first instruction to set the rounding mode.

51. The system of claim 50, wherein executing the first instruction comprises executing an instruction that sets a rounding mode selected from the group of rounding modes comprising:

rounding toward negative infinity;

rounding toward infinity;

rounding toward zero;

rounding away from zero;

rounding to a nearest integer, with a value of one-half being rounded toward negative infinity;

rounding to a nearest integer, with a value of one-half being rounded toward infinity;

rounding to a nearest integer, with a value of one-half being rounded toward zero; and rounding to a nearest integer, with a value of one-half being rounded away from zero.

52. The system of claim 49, wherein the arithmetic operation is a rounded averaging operation of two or four unsigned byte vectors.

53. The system of claim 49, wherein the arithmetic operation is a non-saturating fixed-point fractional multiplication operation with rounding of a set of vector operands selected from signed half-word vectors, unsigned half-word vectors, signed word vectors and unsigned word vectors.

* * * * *